US008853979B2

(12) United States Patent
Wu et al.

(10) Patent No.: US 8,853,979 B2
(45) Date of Patent: Oct. 7, 2014

(54) METHOD AND SYSTEM FOR CALIBRATING ROTOR POSITION OFFSET OF AN ELECTRIC MOTOR

(75) Inventors: Long Wu, Fargo, ND (US); Robert Shaw, Moorhead, MN (US)

(73) Assignee: Deere & Company, Moline, IL (US)

( * ) Notice: Subject to any disclaimer, the term of this patent is extended or adjusted under 35 U.S.C. 154(b) by 132 days.

(21) Appl. No.: 13/169,429

(22) Filed: Jun. 27, 2011

(65) Prior Publication Data

US 2012/0217912 A1  Aug. 30, 2012

Related U.S. Application Data

(60) Provisional application No. 61/447,331, filed on Feb. 28, 2011.

(51) Int. Cl.
*H02P 21/00* (2006.01)
*H02P 6/20* (2006.01)
*H02P 21/14* (2006.01)

(52) U.S. Cl.
CPC ............... *H02P 6/20* (2013.01); *H02P 21/145* (2013.01)
USPC .................. 318/400.02; 318/400.04; 318/700

(58) Field of Classification Search
USPC ....................... 318/400.02, 400.04, 700, 727; 360/77.08
See application file for complete search history.

(56) References Cited

U.S. PATENT DOCUMENTS

| 4,023,083 | A | 5/1977 | Plunkett |
| 4,814,677 | A | 3/1989 | Plunkett |
| 5,428,283 | A | 6/1995 | Kalman et al. |
| 5,486,748 | A | 1/1996 | Konrad et al. |
| 5,857,343 | A * | 1/1999 | Cho et al. ............ 62/89 |
| 5,914,582 | A | 6/1999 | Takamoto et al. |
| 6,005,364 | A | 12/1999 | Acarnley |
| 6,208,110 | B1 | 3/2001 | O'Meara et al. |
| 6,275,000 | B1 | 8/2001 | Nishimura |
| 6,903,525 | B2 | 6/2005 | Carson et al. |
| 7,045,988 | B2 | 5/2006 | Ha et al. |
| 7,157,878 | B2 | 1/2007 | Collier-Hallman |
| 7,358,692 | B2 | 4/2008 | Lee |
| 7,595,604 |  | 9/2009 | Tomigashi |

(Continued)

OTHER PUBLICATIONS

Elbuluk, Malik E. et al. Speed Sensorless Induction Motor Drives for Electrical Actuators: Schemes, Trends and Tradeoffs. NASA Technical Memorandum 107466. Retrieved from the Internet:<URL:http://www.esat.kuleuven.be/electa/publications/fulltexts/pub_479.pdf>.

(Continued)

*Primary Examiner* — Karen Masih

(57) ABSTRACT

While enforcing a fake position in the data processing system and applying a zero direct-axis current command, positive and negative quadrature-axis current commands are applied sequentially and at approximately same magnitude to urge the rotor toward an enforced position. A processing module measures a positive quadrature-axis current aligned raw position data after application of the positive quadrature-axis current command and measures negative quadrature-axis current aligned raw position data for the rotor after application of the negative quadrature-axis command. An initial position offset calibrator or data processor determines a difference between the raw position data to determine an alignment of a true averaging axis. An initial position offset calibrator or data processor determines a raw averaging axis position data based on an average of the raw position data. An initial position offset calibrator or data processor determines a position offset based on a difference between the determined true averaging axis and the determined raw averaging axis position data.

18 Claims, 5 Drawing Sheets

(56) References Cited

U.S. PATENT DOCUMENTS

| | | |
|---|---|---|
| 7,733,044 B2 | 6/2010 | Nakamura et al. |
| 2006/0113949 A1 | 6/2006 | Nishimura et al. |
| 2006/0247829 A1 | 11/2006 | Sato |
| 2007/0263418 A1 | 11/2007 | Ponnaluri et al. |
| 2008/0061724 A1 | 3/2008 | Hao et al. |
| 2010/0188033 A1 | 7/2010 | Daboussi et al. |

OTHER PUBLICATIONS

Van Haute, S. et al. Design and Control of a Permanent Magnet Synchronous Motor Drive for a Hybrid Electric Vehicle. Retrieved from the Internet:<URL:http://www.esat.kuleuven.be/electa/publications/fulltexts/pub_444.pdf>.

International Search Report and Written Opinion of the International Searching Authority dated May 30, 2012 (15 pages).

* cited by examiner

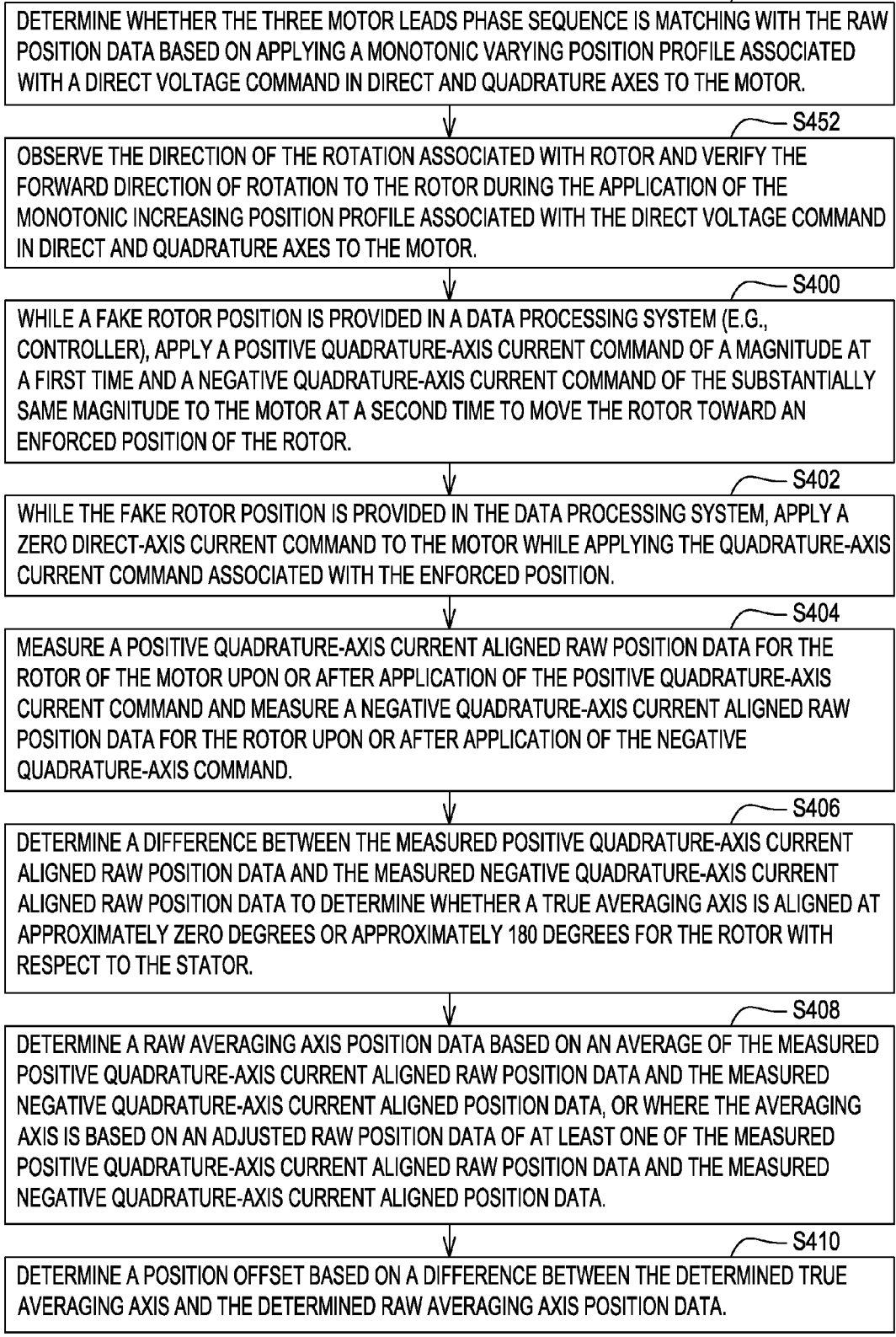

ated with the motor shaft 126 or the rotor. The sensor 115 and

METHOD AND SYSTEM FOR CALIBRATING ROTOR POSITION OFFSET OF AN ELECTRIC MOTOR

This document claims priority based on U.S. provisional application Ser. No. 61/447,331, filed on 28 Feb. 2011 and entitled METHOD AND SYSTEM FOR CALIBRATING ROTOR POSITION OFFSET OF AN ELECTRIC MOTOR, under 35 U.S.C. 119(e).

FIELD OF THE INVENTION

This invention relates to a method and system for calibrating or field calibration of rotor position offset of an electric motor.

BACKGROUND OF THE INVENTION

An electric motor may feature a rotor with permanent magnets and a stator, such as an interior permanent magnet (IPM) motor or IPM synchronous motor. In accordance with certain prior art, an interior permanent magnet (IPM) motor or IPM synchronous machine may not use the same rotor alignment scheme that is generally used with a surface mounted permanent magnet motor because the magnetic torque component and reluctance component of the IPM motor or machine are along different axes. In accordance with other prior art, calibrating a motor with back electromotive force (EMF) measurements generally requires an auxiliary motor to rotate the shaft of the tested IPM motor or machine, which is not practical for or applicable to field calibration of motor position in a vehicle during normal starting or operation of the vehicle. Thus, there is a need for an improved method and system for calibration or field calibration of a position offset of an electric motor.

SUMMARY OF THE INVENTION

In accordance with one embodiment, a method and system is presented for calibrating or field calibrating rotor position offset. While providing a fake rotor position (e.g., fixed fake rotor position) in a data processing system (e.g., in a phase converter) and applying a zero direct-axis current command, positive and negative quadrature-axis current commands are applied sequentially and at approximately same magnitude to urge the rotor toward an enforced position. A processing module measures a positive quadrature-axis current aligned raw position data after application of the positive quadrature-axis current command and measures negative quadrature-axis current aligned raw position data for the rotor after application of the negative quadrature-axis command. An initial position offset calibrator or data processor determines a difference between the raw position data to determine an alignment of a true averaging axis. An initial position offset calibrator or data processor determines a raw averaging axis position data based on an average of the raw position data. An initial position offset calibrator or data processor determines a position offset based on a difference between the determined true averaging axis and the determined raw averaging axis position data.

BRIEF DESCRIPTION OF THE DRAWINGS

FIG. 5 is a flow chart of a third embodiment of a method for calibrating or field calibration of rotor position offset of an electric motor.

DESCRIPTION OF THE PREFERRED EMBODIMENT

Figure 1:
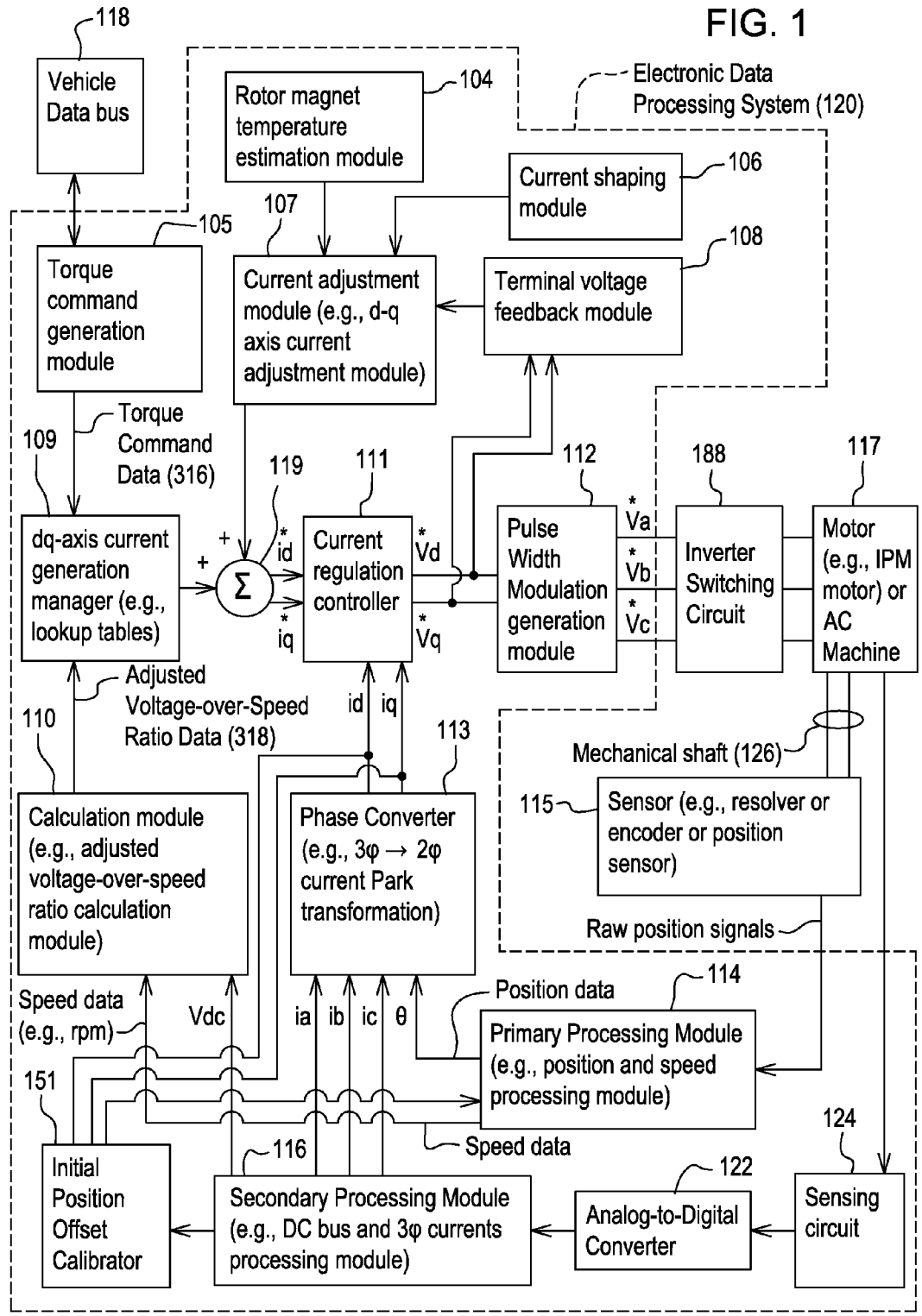
FIG. 1 is a block diagram of one embodiment of a system for calibrating or field calibration of rotor position offset of an electric motor.

In accordance with one embodiment, FIG. 1 discloses system for controlling a motor 117 (e.g., an interior permanent magnet (IPM) motor) or another alternating current machine. In one embodiment, the system, aside from the motor 117, may be referred to as an inverter or a motor controller.

The system comprises electronic modules, software modules, or both. In one embodiment, the motor controller comprises an electronic data processing system 120 to support storing, processing or execution of software instructions of one or more software modules. The electronic data processing system 120 is indicated by the dashed lines in FIG. 1 and is shown in greater detail in FIG. 2.

The data processing system 120 is coupled to an inverter circuit 188. The inverter circuit 188 comprises a semiconductor drive circuit that drives or controls switching semiconductors (e.g., insulated gate bipolar transistors (IGBT) or other power transistors) to output control signals for the motor 117. In turn, the inverter circuit 188 is coupled to the motor 117. The motor 117 is associated with a sensor 115 (e.g., a position sensor, a resolver or encoder position sensor) that is associated with the motor shaft 126 or the rotor. The sensor 115 and the motor 117 are coupled to the data processing system 120 to provide feedback data (e.g., current feedback data, such as $i_a$, $i_b$, $i_c$), raw position signals, among other possible feedback data or signals, for example. Other possible feedback data includes, but is not limited to, winding temperature readings, semiconductor temperature readings of the inverter circuit 188, three phase voltage data, or other thermal or performance information for the motor 117.

In one embodiment, the torque command generation module 105 is coupled to a d-q axis current generation manager 109 (e.g., d-q axis current generation look-up tables). D-q axis current refers to the direct axis current and the quadrature axis current as applicable in the context of vector-controlled alternating current machines, such as the motor 117. The output of the d-q axis current generation manager 109 and the output of a current adjustment module 107 (e.g., d-q axis current adjustment module 107) are fed to a summer 119. In turn, one or more outputs (e.g., direct axis current data ($i_d$*) and quadrature axis current data ($i_q$*)) of the summer 119 are provided or coupled to a current regulation controller 111.

The current regulation controller 111 is capable of communicating with the pulse-width modulation (PWM) generation module 112 (e.g., space vector PWM generation module). The current regulation controller 111 receives respective d-q axis current commands (e.g., $i_d$* and $i_q$*) and actual d-q axis currents (e.g., $i_d$ and $i_q$) and outputs corresponding d-q axis voltage commands (e.g., $v_d$* and $v_q$* commands) for input to the PWM generation module 112.

In one embodiment, the PWM generation module 112 converts the direct axis voltage and quadrature axis voltage data from two phase data representations into three phase representations (e.g., three phase voltage representations, such as $v_a^*$, $v_b^*$ and $v_c^*$) for control of the motor 117, for example. Outputs of the PWM generation module 112 are coupled to the inverter 188.

The inverter circuit 188 comprises power electronics, such as switching semiconductors to generate, modify and control a modulated signal, a pulse-width modulated signal, a pulse-modulated voltage waveform, a voltage signal, or other alternating current signals (e.g., pulse, square wave, sinusoidal, or other waveforms) applied to the motor 117. The PWM generation module 112 provides inputs to a driver stage within the inverter circuit 188. An output stage of the inverter circuit 188 provides a pulse-width modulated signal or other alternating current signal for control of the motor. In one embodiment, the inverter 188 is powered by a direct current (DC) voltage bus.

The motor 117 is associated with a sensor 115 (e.g., a resolver, encoder, speed sensor, or another position sensor or sensors) that estimates at least one of an angular position of the motor shaft 126, a speed or velocity of the motor shaft 126, and a direction of rotation of the motor shaft 126. The sensor 115 may be mounted on or integral with the motor shaft 126. The output of the sensor 115 is capable of communication with the primary processing module 114 (e.g., position and speed processing module). In one embodiment, the sensor 115 may be coupled to an analog-to-digital converter (not shown) that converts analog position data or velocity data to digital position or velocity data, respectively. In other embodiments, the sensor 115 (e.g., digital position encoder) may provide a digital data output of position data or velocity data for the motor shaft 126 or rotor.

A first output (e.g., position data and speed data for the motor 117) of the primary processing module 114 is communicated to the phase converter 113 (e.g., three-phase to two-phase current Park transformation module) that converts respective three-phase digital representations of measured current into corresponding two-phase digital representations of measured current. A second output (e.g., speed data) of the primary processing module 114 is communicated to the calculation module 110 (e.g., adjusted voltage over speed ratio module).

An input of a sensing circuit 124 is coupled to terminals of the motor 117 for sensing at least the measured three-phase currents and a voltage level of the direct current (DC) bus (e.g., high voltage DC bus which may provide DC power to the inverter circuit 188). An output of the sensing circuit 124 is coupled to an analog-to-digital converter 122 for digitizing the output of the sensing circuit 124. In turn, the digital output of the analog-to-digital converter 122 is coupled to the secondary processing module 116 (e.g., Direct current (DC) bus and three phase current processing module). For example, the sensing circuit 124 is associated with the motor 117 for measuring three phase currents (e.g., current applied to the windings of the motor 117, back EMF induced into the windings, or both).

Certain outputs of primary processing module 114 and the secondary processing module 116 feed the phase converter 113. For example, the phase converter 113 may apply a Park transformation or other conversion equations (e.g., certain conversion equations that are suitable are known to those of ordinary skill in the art) to convert the measured three-phase representations of current into two-phase representations of current based on the digital three-phase current data from the secondary processing module 116 and position data from the sensor 115. The output of the phase converter 113 module is coupled to the current regulation controller 111.

Other outputs of the primary processing module 114 and the secondary processing module 116 may be coupled to inputs of the calculation module 110 (e.g., adjusted voltage over-speed ratio calculation module). For example, the primary processing module 114 may provide speed data (e.g., motor shaft 126 revolutions per minute), whereas the secondary processing module 116 may provide a measured level of direct current voltage (e.g., on the direct current (DC) bus of a vehicle). The direct current voltage level on the DC bus that supplies the inverter circuit 188 with electrical energy may fluctuate or vary because of various factors, including, but not limited to, ambient temperature, battery condition, battery charge state, battery resistance or reactance, fuel cell state (if applicable), motor load conditions, respective motor torque and corresponding operational speed, and vehicle electrical loads (e.g., electrically driven air-conditioning compressor). The calculation module 110 is connected as an intermediary between the secondary processing module 116 and the dq-axis current generation manager 109. The output of the calculation module 110 can adjust or impact current commands generated by the d-q axis current generation manager 109 to compensate for fluctuation or variation in direct current bus voltage, among other things.

The initial position offset calibrator 151 or the primary position module 114 supports calibration of an initial position offset of the motor shaft 126. In one embodiment, the initial position offset calibrator 151 is capable of communicating with the primary processing module 114, the secondary processing module 116, and receiving measured current input data (e.g., direct-axis and quadrature axis current data) from an output of the phase converter 113, for example.

The rotor magnet temperature estimation module 104, the current shaping module 106, and the terminal voltage feedback module 108 are coupled to or are capable of communicating with the dq-axis current adjustment module 107. In turn, the d-q axis current module 107 may communicate with the dq-axis current generation manager or the summer 119.

The rotor magnet temperature module 104 estimates or determines the temperature of the rotor permanent magnet or magnets. In one embodiment, the rotor magnet temperature estimation module 104 may estimate the temperature of the rotor magnets from one or more sensors located on the stator, in thermal communication with the stator, or secured to the housing of the motor 117.

In an alternative embodiment, the rotor magnet temperature estimation module 104 may be replaced with a temperature detector (e.g., a thermistor or infrared thermal sensor coupled to a wireless transmitter) mounted on the rotor or the magnet, where the detector provides a signal (e.g., wireless signal) indicative of the temperature of the magnet or magnets.

In one embodiment, the method or system may operate in the following manner. The torque command generation module 105 receives an input control data message, such as a speed control data message, a voltage control data message, or a torque control data message, over a vehicle data bus 118. The torque command generation module 105 converts the received input control message into torque control command data 316.

The d-q axis current generation manager 109 selects or determines the direct axis current command data and the quadrature axis current command data associated with respective torque control command data and respective detected motor shaft 126 speed data. For example, the d-q axis current generation manager 109 selects or determines the direct axis current command, the quadrature axis current command by accessing one or more of the following: (1) a look-up table, database or other data structure that relates respective torque commands to corresponding direct and quadrature axes currents, (2) a set of quadratic equations or linear equations that relate respective torque commands to corresponding direct and quadrature axes currents, or (3) a set of rules (e.g., if-then rules) that relates respective torque commands to corresponding direct and quadrature axes currents. The sensor 115 on the motor 117 facilitates provision of the detected speed data for the motor shaft 126, where the primary processing module 114 may convert position data provided by the sensor 115 into speed data.

The current adjustment module 107 (e.g., d-q axis current adjustment module) provides current adjustment data to adjust the direct axis current command data and the quadrature axis current command data based on input data from the rotor magnet temperature estimation module 104, the current shaping module 106, and the terminal voltage feedback module 108.

The current shaping module 106 may determine a correction or preliminary adjustment of the quadrature axis (q-axis) current command and the direct axis (d-axis) current command based on one or more of the following factors: torque load on the motor 117 and speed of the motor 117, for example. The rotor magnet temperature estimation module 104 may generate a secondary adjustment of the q-axis current command and the d-axis current command based on an estimated change in rotor temperature, for example. The terminal voltage feedback module 108 may provide a third adjustment to the d-axis and q-axis current based on controller voltage command versus voltage limit. The current adjustment module 107 may provide an aggregate current adjustment that considers one or more of the following adjustments: a preliminary adjustment, a secondary adjustment, and a third adjustment.

In one embodiment, the motor 117 may comprise an interior permanent magnet (IPM) machine or an IPM synchronous machine (IPMSM). An IPMSM has many favorable advantages compared with conventional induction machines or surface mounted PM machines (SMPM) such as high efficiency, high power density, wide constant power operating region, maintenance free, for instance.

The sensor 115 (e.g., shaft or rotor speed detector) may comprise one or more of the following: a direct current motor, an optical encoder, a magnetic field sensor (e.g., Hall Effect sensor), magneto-resistive sensor, and a resolver (e.g., a brushless resolver). In one configuration, the sensor 115 comprises a position sensor, where position data and associated time data are processed to determine speed or velocity data for the motor shaft 126. In another configuration, the sensor 115 comprises a speed sensor, or the combination of a speed sensor and an integrator to determine the position of the motor shaft.

In yet another configuration, the sensor 115 comprises an auxiliary, compact direct current generator that is coupled mechanically to the motor shaft 126 of the motor 117 to determine speed of the motor shaft 126, where the direct current generator produces an output voltage proportional to the rotational speed of the motor shaft 126. In still another configuration, the sensor 115 comprises an optical encoder with an optical source that transmits a signal toward a rotating object coupled to the shaft 126 and receives a reflected or diffracted signal at an optical detector, where the frequency of received signal pulses (e.g., square waves) may be proportional to a speed of the motor shaft 126. In an additional configuration, the sensor 115 comprises a resolver with a first winding and a second winding, where the first winding is fed with an alternating current, where the voltage induced in the second winding varies with the frequency of rotation of the rotor.

Figure 2:
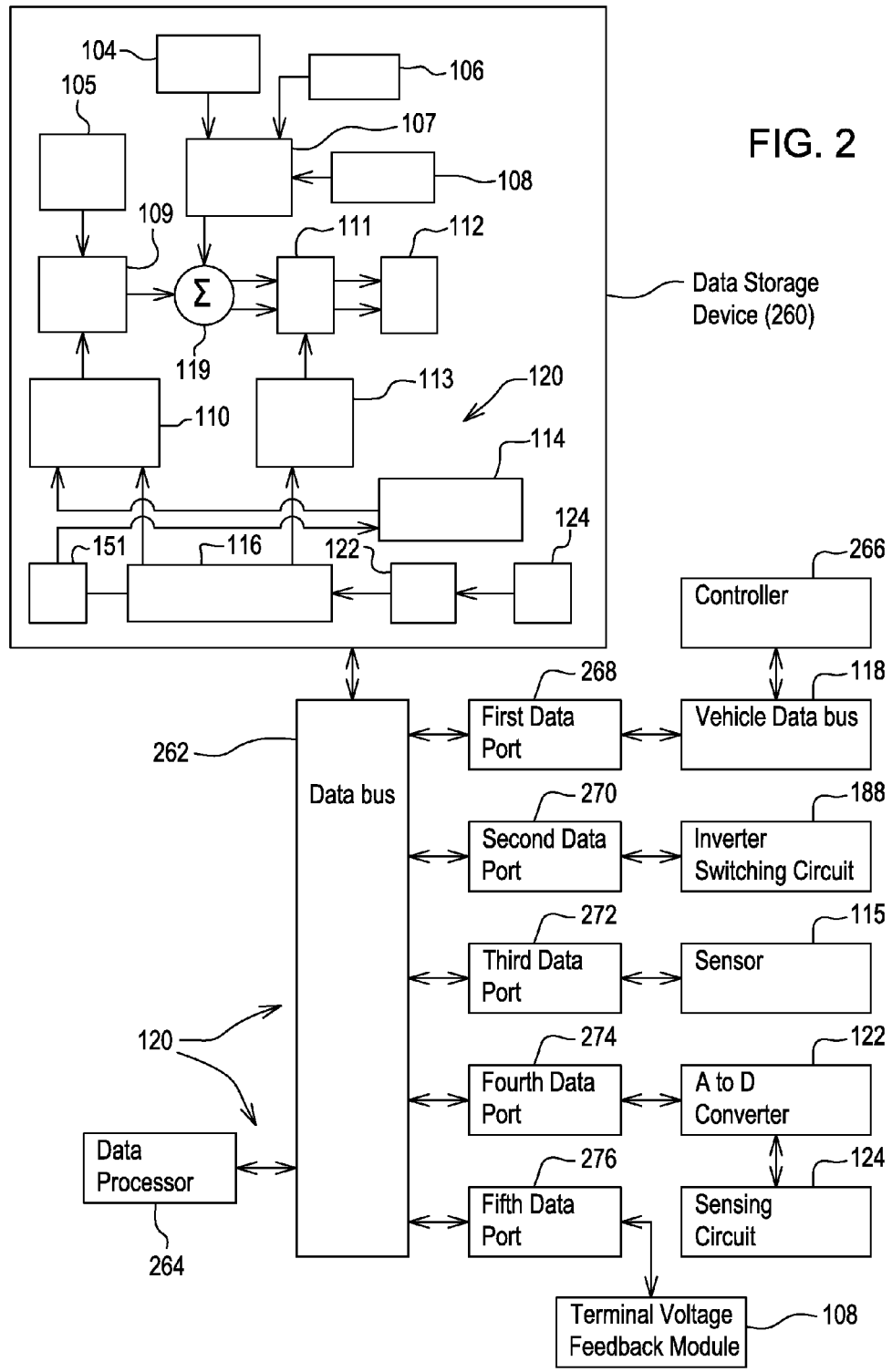
FIG. 2 is a block diagram of an electronic data processing system consistent with FIG. 1.

In FIG. 2, the electronic data processing system 120 comprises an electronic data processor 264, a data bus 262, a data storage device 260, and one or more data ports (268, 270, 272, 274 and 276). The data processor 264, the data storage device 260 and one or more data ports are coupled to the data bus 262 to support communications of data between or among the data processor 264, the data storage device 260 and one or more data ports.

In one embodiment, the data processor 264 may comprise an electronic data processor, a microprocessor, a microcontroller, a programmable logic array, a logic circuit, an arithmetic logic unit, an application specific integrated circuit, a digital signal processor, a proportional-integral-derivative (PID) controller, or another data processing device or combination of data processing devices.

The data storage device 260 may comprise any magnetic, electronic, or optical device for storing data. For example, the data storage device 260 may comprise an electronic data storage device, an electronic memory, non-volatile electronic random access memory, one or more electronic data registers, data latches, a magnetic disc drive, a hard disc drive, an optical disc drive, or the like.

As shown in FIG. 2, the data ports comprise a first data port 268, a second data port 270, a third data port 272, a fourth data port 274 and a fifth data port 276, although any suitable number of data ports may be used. Each data port may comprise a transceiver and buffer memory, for example. In one embodiment, each data port may comprise any serial or parallel input/output port.

In one embodiment as illustrated in FIG. 2, the first data port 268 is coupled to the vehicle data bus 118. In turn, the vehicle data bus 118 is coupled to the controller 266. In one configuration, the second data port 270 may be coupled to the inverter circuit 188; the third data port 272 may be coupled to the sensor 115; the fourth data port 274 may be coupled to the analog-to-digital converter 122; and the fifth data port 276 may be coupled to the terminal voltage feedback module 108. The analog-to-digital converter 122 is coupled to the sensing circuit 124.

In one embodiment of the data processing system 120, the torque command generation module 105 is associated with or supported by the first data port 268 of the electronic data processing system 120. The first data port 268 may be coupled to a vehicle data bus 118, such as a controller area network (CAN) data bus. The vehicle data bus 118 may provide data bus messages with torque commands to the torque command generation module 105 via the first data port 268. The operator of a vehicle may generate the torque commands via a user interface, such as a throttle, a pedal, a controller 266, or other control device.

In certain embodiments, the sensor 115 and the primary processing module 114 may be associated with or supported by a third data port 272 of the data processing system 120.

Various embodiments of the method and system disclosed herein use a fake rotor position or a reference rotor position. As used throughout this document, a fake rotor position or a fixed fake rotor position is not based on an actual measurement by the sensor 115 of the actual rotor position. Rather, the data processing system 120 or the primary processing module 114 may provide fake position data or reference position data to the phase converter 113. The phase converter 113 uses the fake position data or reference position data, as opposed to actual position data in the Park transformation (e.g., conversion from three phase measurements to two phase representations) to provide measured direct-axis current and measured quadrature-axis current to the current regulation controller 111. At the phase converter 113, the fake position data is used in conjunction with actual measured three phase current data, where the measured three phase currents are provided by the sensing circuit 124 via the analog-to-digital converter 122 to the secondary processing module 116. For example, in one configuration the fake position data or fixed fake rotor position may be approximately equal to zero (0) degrees of the rotor with respect to the stator of the motor 117.

In one embodiment, the data processor 264 or the data processing system 120 may be configured to determine an error or deviation between the fake position data and the actual position data detected by the sensor 115 and the primary processing module 114, where the rotor is at an enforced position (or actual position) that is supposed to be: (a) aligned with the fake position; (b) substantially equal to the fake position, or (c) separated by a known relationship or a fixed reference angular displacement to the fake position. The foregoing error or deviation data may be used to calibrate or estimate the position offset. For example, multiple enforced positions may be used for calibration, where the fake position is held constant or fixed (e.g., at zero degrees).

As used throughout this document, "approximately" used in conjunction with an angular position or other number shall mean plus or minus five percent of the angular position or other number. As used through this document, "around" used in conjunction with an angular position or another number shall mean plus or minus ten percent of the angular position or other number.

Figure 3:
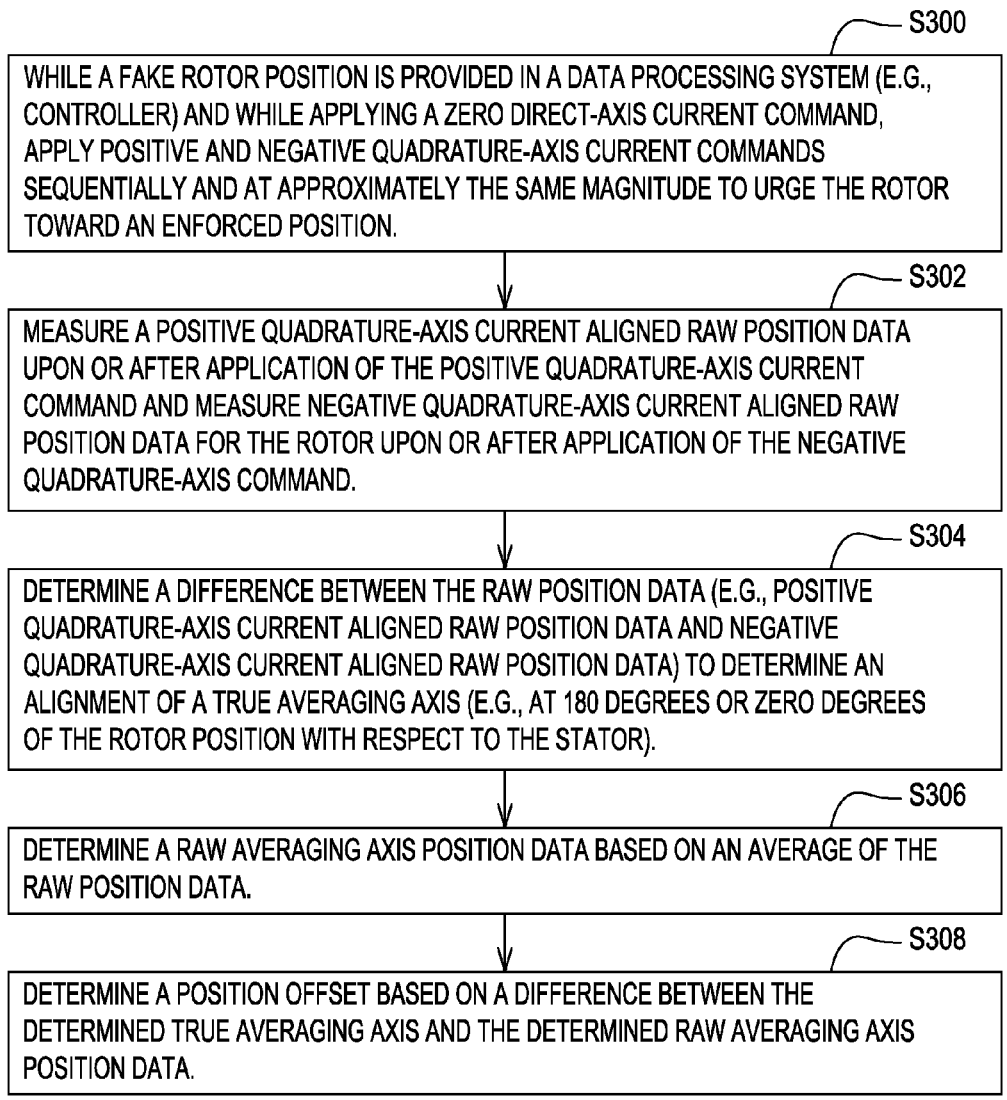
FIG. 3 is a flow chart of a first embodiment of a method for calibrating or field calibration of rotor position offset of an electric motor.

FIG. 3 discloses a method of calibrating or field calibrating the position offset of a rotor in a motor, such as an interior permanent magnet (IPM) motor. The method of FIG. 4 starts in step S300.

In step S300, while a fake rotor position (e.g., fixed fake rotor position or zero degrees rotor position with respect to the stator of the motor 117) is provided in the data processing system 120 (e.g., for purposes of the Park transformation of the phase converter 113) and while the PWM generation module 112, inverter circuit 188 or controller applies a zero direct-axis current command, the PWM generation module 112, inverter circuit 188 or controller applies sequentially positive and negative quadrature-axis current commands approximately the same magnitude to urge or move the rotor toward an enforced position. Here, approximately the same magnitude or substantially the same magnitude means equal or plus or minus five percent of the value of the magnitude.

The enforced position may be aligned with, substantially equal to, or separated from the fixed fake rotor position. In one embodiment, where the enforced position is aligned with or substantially equal to the fake rotor position, a difference between the enforced position and the fake rotor position comprises an error or an indication of error. In another embodiment, where there is a known relationship (e.g., angular displacement or fixed angular separation) between the enforced position and the fixed fake rotor position, the deviation from the known relationship or fixed angular separation comprises an error or indication of an error.

In accordance with one illustrative example for carrying out step S300, $\theta_{pos\_i^*_q}$ is defined as the final alignment raw position after applying a positive quadrature-axis current command (e.g., $i_q^*$ of +200 amperes), and zero id command and forced position of 0 degree, whereas $\theta_{neg\_i^*_q}$ is defined as the final alignment raw position after applying a negative quadrature-axis command (e.g., $i_q^*$ of −200 amperes), and zero direct-axis current command ($i_d^*$) and a forced or enforced position of 0 degrees.

In step S302, a processing module or primary processing module 114 measures a first (e.g., positive quadrature-axis current) aligned raw position data upon or after application of the positive quadrature-axis current command to the motor 117 by the circuit. Further in step S302, the processing module or primary processing module 114 measures a second (e.g., negative quadrature-axis current) aligned raw position data for the rotor upon or after application of the negative quadrature-axis command to the motor 117 by the inverter circuit 188. The first aligned raw position data may range between zero and 360 degrees of the rotor with respect to the stator of the motor 117, for example. Similarly, the second aligned raw position data may range between zero and 360 degrees of the rotor with respect to the stator of the motor 117, for example.

In step S304, an initial position offset calibrator 151, a data processor 264, or the primary processing module 114 determines a difference between the raw position data (e.g., positive quadrature-axis current aligned raw position data and negative quadrature-axis current aligned raw position data) to determine an alignment of a true averaging axis (e.g., at 180 degrees or at zero degrees of rotor position with respect to the stator, where the fake rotor position is approximately zero degrees). For example, the initial position offset calibrator 151, a data processor 264, or the primary processing module 114 determines a difference between the first aligned raw position data and the second aligned raw position data.

In step S306, an initial position offset calibrator 151, the data processor 264, or primary processing module 114 determines a raw averaging axis position data based on an average of the raw position data (e.g., average of the first aligned raw position data, the second aligned raw position data, or both).

In step S308, an initial position offset calibrator 151, the data processor 264, or the primary processing module 114 determines a position offset based on a difference between the determined true averaging axis and the determined raw averaging axis position data.

Figure 4:
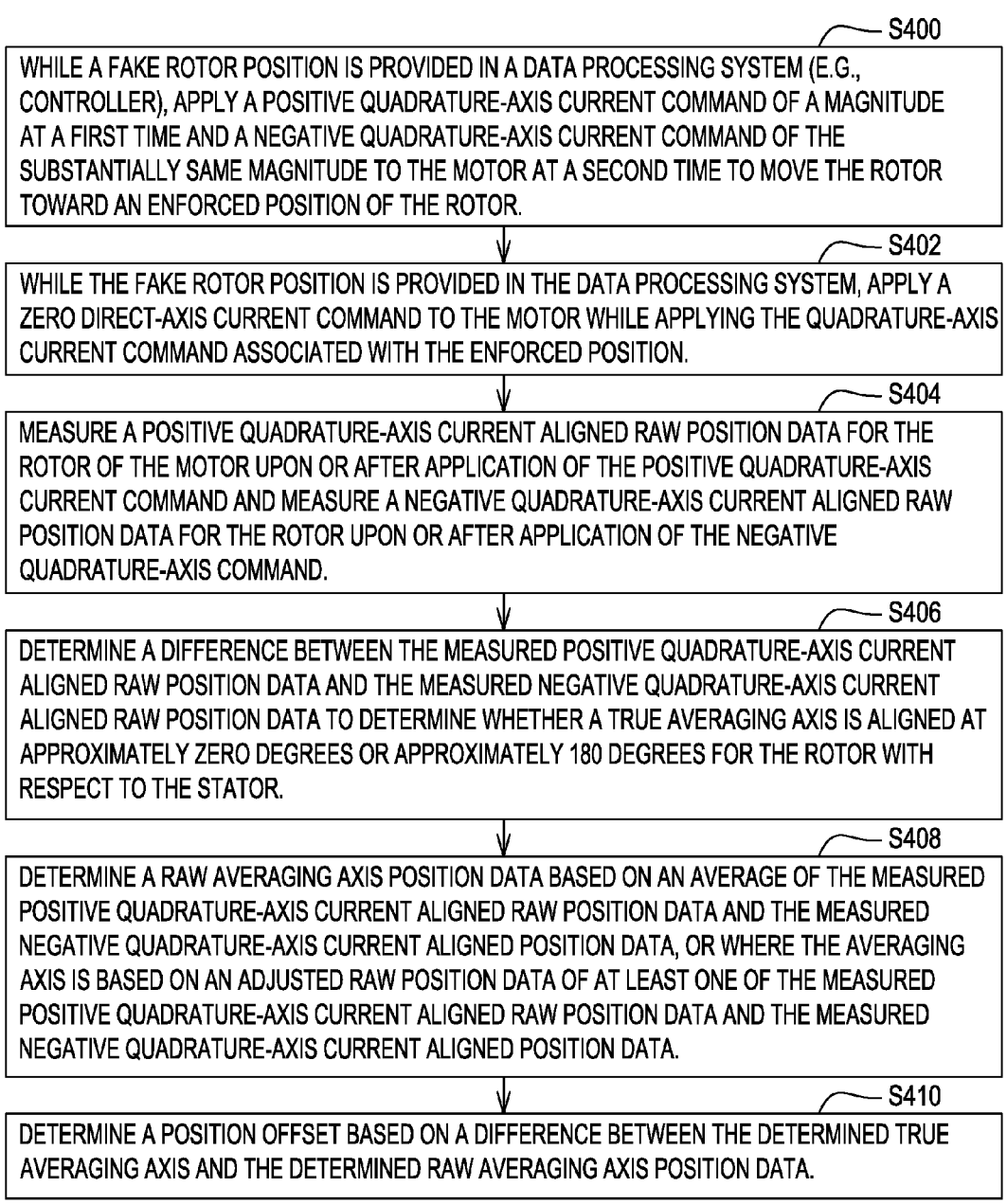
FIG. 4 is a flow chart of a second embodiment of a method for calibrating or field calibration of rotor position offset of an electric motor.

FIG. 4 discloses a method of calibrating or field calibrating the position offset of a rotor in a motor, such as an interior permanent magnet (IPM) motor. The method of FIG. 4 starts in step S400.

In step S400, while a corresponding fake rotor position (e.g., fixed fake rotor position or zero degrees rotor position with respect to the stator of the motor 117) is provided in the data processing system 120 (e.g., for purposes of the Park transformation of the phase converter 113), an inverter circuit 188, controller, or pulse width modulation (PWM) generation module 112 applies a positive quadrature-axis current command of a magnitude at a first time and a negative quadrature-axis current command of the substantially same magnitude to the motor 117 at a second time to move the rotor toward an enforced position of the rotor. Here, the substantially same magnitude means equal or plus or minus five percent of the value of the magnitude. In one embodiment, the motor 117 comprises an interior permanent magnet (IPM) motor or another alternating current machine where the magnetic torque component and the reluctance torque component of the machine lie along different axes.

In step S402, while the fake rotor position (e.g., fixed fake rotor position or zero degrees rotor position with respect to the stator of the motor 117) is provided in the data processing system 120 (e.g., for purposes of the Park transformation of the phase converter 113), an inverter circuit 188, controller or pulse width modulation (PWM) generation module 112 applies a zero direct-axis current command to the motor 117, while applying the quadrature-axis current commands associated with an the enforced position to the motor 117.

In step S404, a primary processing module 117 or data processor 264 measures first (e.g., positive quadrature-axis current) aligned raw position data for the rotor of the motor upon or after application of the positive quadrature-axis current command and measures second (e.g., negative quadrature-axis current) aligned raw position data for the rotor of the motor 117 upon or after application of the negative quadrature-axis command. For example, the measured raw position data results from the application of one or more quadrature-axis current commands with opposite magnitudes. The first aligned raw position data may range between zero and 360 degrees of the rotor with respect to the stator of the motor 117, for example. Similarly, the second aligned raw position data may range between zero and 360 degrees of the rotor with respect to the stator of the motor 117, for example.

In step S406, an initial position offset calibrator 151 or the data processor 264 determines a difference between the measured first (e.g., positive quadrature-axis current) aligned raw position data and the measured second (e.g., negative quadrature-axis current) aligned raw position data to determine whether a true averaging axis is aligned at approximately zero degrees or approximately 180 degrees for the rotor with respect to the stator, where the fake rotor position is approximately zero degrees.

In step S408, the initial position offset calibrator 151, the data processor 264, or the primary processing module 114 determines a raw averaging axis position data based on an average of the measured first (e.g., positive quadrature-axis current) aligned raw position data and the measured second (e.g., negative quadrature-axis current) aligned position data, or where the averaging axis is based on an adjusted raw position data of at least one of the measured first (e.g., positive quadrature-axis current) aligned raw position data and the measured second (e.g., negative quadrature-axis current) aligned position data.

In step S410, an initial position offset calibrator 151, data processor 264, or primary processing module 114 determines a position offset based on a difference between the determined true averaging axis and the determined raw averaging axis position data. Step S410 may be carried out in accordance with various procedures that may be applied alternately or cumulatively.

In accordance with a first procedure, if the determining a difference between the measured first (e.g., positive quadrature-axis current) aligned raw position data and the measured second (e.g., negative quadrature-axis current) aligned raw position data is greater than approximately 185 degrees (or around 185 degrees) and if the measured second (e.g., negative quadrature-axis current) aligned raw position data is greater than the measured first (e.g., positive quadrature-axis current) aligned raw position data, then the following equations apply to determining the true position offset:

If $\theta_{neg\_i^*_q} - \theta_{pos\_i^*_q} > 185°$, then $\theta_{axis\_true} = 0°$;

if $\theta_{neg\_i^*_q}^{adj} = \theta_{neg\_i^*_q} - 360°$, such that $\theta_{pos\_i^*_q} - \theta_{ned\_i^*_q}^{adj} < 175°$, then $$\theta_{axis\_raw} = \frac{\theta_{pos\_i^*_q} + \theta_{neg\_i^*_q}^{adj}}{2}$$

and the position offset is $$\theta_{offset} = \theta_{axis\_true} - \theta_{axis\_raw} = -\frac{\theta_{pos\_i^*_q} + \theta_{neg\_i^*_q}^{adj}}{2}.$$

In the above equations, $\theta_{neg\_i^*_q}$ is the first aligned raw position data associated with the negative quadrature-axis current command, $\theta_{pos\_i^*_q}$ is the second aligned raw position data associated with the positive quadrature-axis current command, $\theta_{axis\_true}$ is the true averaging axis, $\theta_{neg\_i^*_q}^{adj}$ is the adjusted first aligned raw position data associated with the negative quadrature-axis current command, $\theta_{axis\_raw}$ is the raw averaging axis position data, and the position offset is $\theta_{offset}$. In the above equations is it understood that the 185 degrees may be set to be approximately 185 degrees or around 185 degrees, and that 175 degrees may be set to be approximately 175 degrees or around 175 degrees based on the actual operating characteristics, design and specification for the motor 117, for example.

In accordance with a second procedure, the determining a difference between the measured first (e.g., positive quadrature-axis current) aligned raw position data and the measured second (e.g., negative quadrature-axis current) aligned raw position data is less than approximately 175 degrees and if the measured second (e.g., negative quadrature-axis current) aligned raw position data is less than the measured first (e.g., positive quadrature-axis current) aligned raw position data, then the following equations apply to determining the true position offset:

If $\theta_{pos\_i^*_q} < 175°$, then $\theta_{axis\_true} = 0°$ and $$\theta_{axis\_raw} = \frac{\theta_{pos\_i^*_q} + \theta_{neg\_i^*_q}}{2}$$

such that position offset is $$\theta_{offset} = \theta_{axis\_true} - \theta_{axis\_raw} = -\frac{\theta_{pos\_i^*_q} + \theta_{neg\_i^*_q}}{2}.$$

In the above equations, $\theta_{neg\_i^*_q}$ is the first aligned raw position data associated with the negative quadrature-axis current command, $\theta_{pos\_i^*_q}$ is the second aligned raw position data associated with the positive quadrature-axis current command, $\theta_{axis\_true}$ is the true averaging axis, $\theta_{neg\_i^*_q}^{adj}$ is the adjusted second aligned raw position data associated with the negative quadrature-axis current command, $\theta_{axis\_raw}$ is the raw averaging axis position data, and the position offset is $\theta_{offset}$. In the above equations is it understood that 175 degrees may be set to be approximately 175 degrees or around 175 degrees based on the actual operating characteristics, design and specification for the motor 117, for example.

In accordance with a third procedure, if the determining a difference between the measured first (e.g., positive quadrature-axis current) aligned raw position data and the measured second (e.g., negative quadrature-axis current) aligned raw position data is less than approximately 175 degrees and if the measured second (e.g., negative quadrature-axis current) aligned raw position data is greater than the measured first (e.g., positive quadrature-axis current) aligned raw position data, then the following equations apply to determining the position offset:

If $\theta_{neg\_i^*_q} - \theta_{pos\_i^*_q} < 175°$, then $\theta_{axis\_true} = 180°$ or $\theta_{axis\_true} = -180°$ and then $$\theta_{axis\_raw} = \frac{\theta_{pos\_i_q^*} + \theta_{neg\_i_q^*}}{2}$$

such that position offset is $$\theta_{offset} = \theta_{axis\_true} - \theta_{axis\_raw} = 180° - \frac{\theta_{pos\_i_q^*} + \theta_{neg\_i_q^*}}{2}.$$

In the above equations, $\theta_{neg\_i^*_q}$ is the first aligned raw position data associated with the negative quadrature-axis current command, $\theta_{pos\_i^*_q}$ is the second aligned raw position data associated with the positive quadrature-axis current command, $\theta_{axis\_true}$ is the true averaging axis, $\theta_{neg\_i^*_q}^{adj}$ is the adjusted second aligned raw position data associated with the negative quadrature-axis current command, $\theta_{axis\_raw}$ is the raw averaging axis position data, and the position offset is $\theta_{offset}$. In the above equations is it understood that 175 degrees may be set to be approximately 175 degrees or around 175 degrees based on the actual operating characteristics, design and specification for the motor 117, for example.

In accordance with a fourth procedure, if the determining a difference between the measured first (e.g., positive quadrature-axis current) aligned raw position data and the measured second (e.g., negative quadrature-axis current) aligned raw position data is greater than approximately 185 degrees and if the measured negative quadrature-axis current aligned raw position data is less than the measured positive quadrature-axis current aligned raw position data, then the following equations apply to determining the position offset:

If $\theta_{pos\_i^*_q} - \theta_{neg\_i^*_q} > 185°$, then $\theta_{axis\_true} = 180°$ or $\theta_{axis\_true} = -180°$;

$\theta_{pos\_i^*_q}^{adj} = \theta_{pos\_i^*_q} - 360°$, such that $\theta_{neg\_i^*_q} - \theta_{pos}i^*_q{}^{adj} < 175°$ and then $$\theta_{axis\_raw} = \frac{\theta_{pos\_i_q^*}^{adj} + \theta_{neg\_i_q^*}}{2}$$

such that the position offset is $$\theta_{offset} = \theta_{axis\_true} - \theta_{axis\_raw} = 180° - \frac{\theta_{pos\_i_q^*}^{adj} + \theta_{neg\_i_q^*}}{2}.$$

In the above equations, $\theta_{neg\_i^*_q}^{adj}$ is the first aligned raw position data associated with the negative quadrature-axis current command, $\theta_{pos\_i^*_q}$ is the second aligned raw position data associated with the positive quadrature-axis current command, $\theta_{axis\_true}$ is the true averaging axis, $\theta_{pos\_i^*_q}^{adj}$ is the adjusted second aligned raw position data associated with the negative quadrature-axis current command, $\theta_{axis\_raw}$ is the raw averaging axis position data, and the position offset is $\theta_{offset}$. In the above equations is it understood that the 185 degrees may be set to be approximately 185 degrees or around 185 degrees, and that 175 degrees may be set to be approximately 175 degrees or around 175 degrees based on the actual operating characteristics, design and specification for the motor 117, for example.

FIG. 5 discloses a method of calibrating or field calibrating the position offset of a rotor in a motor, such as an interior permanent magnet (IPM) motor. The method of FIG. 5 is similar to the method of FIG. 4, except the method of FIG. 5 further includes steps S450 and S452. Like steps or procedures in FIG. 4 and FIG. 5 are indicated by like reference numbers.

In practice, steps S450 and S452 are typically performed prior to steps S400 through step S41, inclusive, of FIG. 5.

In step S450, the initial position offset calibrator 151, the pulse-width modulation generation module 112, the inverter 188 or the data processor 264 determines whether the three motor leads phase sequence is matching with the raw position data based on applying a monotonic varying position profile associated with a direct voltage command in direct and quadrature axes to the motor 117. For example, the monotonic varying position profile may be stored in the data storage device 260 and implemented by the pulse width generation module 112. In an alternate embodiment, the monotonic varying position profile may be implemented by specific electronic hardware in the inverter circuit 188.

In step S452, the initial position offset calibrator 151 or the data processor 264 observes the direction of the rotation associated with rotor and verifying the forward direction of rotation of the rotor during the application of the monotonic increasing position profile (in step S450) associated with the direct voltage command in direct and quadrature axes to the motor.

For an IPM machine, there are both magnetic torque and reluctance torque component. The magnetic torque component, determined by current vector projection along quadrature-axis (q-axis), is always trying to bring true rotor direct-axis (d-axis) to the current vector. However, the reluctance torque component, determined by current vector projection along both q-axis and d-axis, is always trying to bring true rotor d-axis 90 degrees away from the current vector. Therefore, for an IPM machine, due to the different torque alignment effects from magnetic torque component and reluctance torque component, a forced or enforced position and a single direction torque command is not readily used to align the rotor to a desired position.

The method and system disclosed herein is well-suited for calibration of the initial rotor position offset of an IPM motor or other electric machines with different torque components trying to align the rotor along different axes. Calibrating the initial position offset of the rotor for IPM machines can significantly improve motor control performance to achieve desired output torque and power level and assure robust controllability.

Having described the preferred embodiment, it will become apparent that various modifications can be made without departing from the scope of the invention as defined in the accompanying claims.

The following is claimed:

1. A method for calibrating or field calibrating rotor position offset, the method comprising:
while providing a fixed fake rotor position and while applying a zero direct-axis current command, applying positive and negative quadrature-axis current commands sequentially and at approximately same magnitude to urge the rotor toward an enforced position;
measuring a positive quadrature-axis current aligned raw position data after application of the positive quadrature-axis current command and measuring negative quadrature-axis current aligned raw position data for the rotor after application of the negative quadrature-axis command;
determining a difference between the raw position data to determine an alignment of a true averaging axis;

determining a raw averaging axis position data based on an average of the raw position data; and determining a position offset based on a difference between the determined true averaging axis and the determined raw averaging axis position data.

2. The method according to claim 1 wherein the determining the alignment of the true averaging axis comprises determining whether the true averaging axis is aligned at approximately zero degrees or approximately 180 degrees for the rotor with respect to the stator based on the determined difference between the raw position data, where the fake rotor position is approximately zero degrees.

3. The method according to claim 1 wherein the fake rotor position is fixed at approximately zero degrees for use within a Park transformation with a phase converter for converting measured three phase current representations into two phase current representations.

4. The method according to claim 1 wherein if the determining a difference between the measured positive quadrature-axis current aligned raw position data and the measured negative quadrature-axis current aligned raw position data is greater than approximately 185 degrees, or around 185 degrees, and if the measured negative quadrature-axis current aligned raw position data is greater than the measured positive quadrature-axis current aligned raw position data, then the following equations apply to determining the true position offset:

If $\theta_{neg\_i^*_q} - \theta_{pos\_i^*_q} > 185°$, then $\theta_{axis\_true} = 0°$ and $\theta_{neg\_i^*_q}^{adj} = \theta_{neg\_i^*_q} - 360°$, such that $\theta_{pos\_i^*_q} - \theta_{neg\_i^*_q}^{adj} < 175°$, and then $$\theta_{axis\_raw} = \frac{\theta_{pos\_i^*_q} + \theta_{neg\_i^*_q}^{adj}}{2}$$

such that the position offset is $$\theta_{offset} = \theta_{axis\_true} - \theta_{axis\_raw} = -\frac{\theta_{pos\_i^*_q} + \theta_{neg\_i^*_q}^{adj}}{2},$$

where $\theta_{neg\_i^*_q}$ is the first aligned raw position data associated with the negative quadrature-axis current command, $\theta_{pos\_i^*_q}$ is the second aligned raw position data associated with the positive quadrature-axis current command, $\theta_{axis\_true}$ is the true averaging axis, $\theta_{neg\_i^*_q}^{adj}$ is the adjusted first aligned raw position data associated with the negative quadrature-axis current command, $\theta_{axis\_raw}$ is the raw averaging axis position data, and the position offset is $\theta_{offset}$, and where the above 175 degrees is around 175 degrees.

5. The method according to claim 1 wherein if the determining a difference between the measured positive quadrature-axis current aligned raw position data and the measured negative quadrature-axis current aligned raw position data is less than approximately 175 degrees, or around 175 degrees, and if the measured negative quadrature-axis current aligned raw position data is less than the measured positive quadrature-axis current aligned raw position data, then the following equations apply to determining the true position offset:

If $\theta_{pos\_i^*_q} - \theta_{neg\_i^*_q} < 175°$, then $\theta_{axis\_true} = 0°$ and then $$\theta_{axis\_raw} = \frac{\theta_{pos\_i^*_q} + \theta_{neg\_i^*_q}}{2},$$

such that the position offset is $$\theta_{offset} = \theta_{axis\_true} - \theta_{axis\_raw} = -\frac{\theta_{pos\_i^*_q} + \theta_{neg\_i^*_q}}{2}$$

where $\theta_{neg\_i^*_q}$ is the first aligned raw position data associated with the negative quadrature-axis current command, $\theta_{pos\_i^*_q}$ is the second aligned raw position data associated with the positive quadrature-axis current command, $\theta_{axis\_true}$ is the true averaging axis, $\theta_{axis\_raw}$ is the raw averaging axis position data, and the position offset is $\theta_{offset}$.

6. The method according to claim 1 wherein if the determining a difference between the measured positive quadrature-axis current aligned raw position data and the measured negative quadrature-axis current aligned raw position data is less than approximately 175 degrees, or around 175 degrees, and if the measured negative quadrature-axis current aligned raw position data is greater than the measured positive quadrature-axis current aligned raw position data, then the following equations apply to determining the position offset:

If $\theta_{neg\_i^*_q} - \theta_{pos\_i^*_q} < 175°$, then $\theta_{axis\_true} = 0°$ or $\theta_{axis\_true} = 180°$ and then $$\theta_{axis\_raw} = \frac{\theta_{pos\_i^*_q} + \theta_{neg\_i^*_q}}{2}$$

such that position offset is $$\theta_{offset} = \theta_{axis\_true} - \theta_{axis\_raw} = 180° - \frac{\theta_{pos\_i^*_q} + \theta_{neg\_i^*_q}}{2},$$

where $\theta_{neg\_i^*_q}$ is the first aligned raw position data associated with the negative quadrature-axis current command, $\theta_{pos\_i^*_q}$ is the second aligned raw position data associated with the positive quadrature-axis current command, $\theta_{axis\_true}$ is the true averaging axis, $\theta_{axis\_raw}$ is the raw averaging axis position data, and the position offset is $\theta_{offset}$.

7. The method according to claim 1 wherein if the determining a difference between the measured positive quadrature-axis current aligned raw position data and the measured negative quadrature-axis current aligned raw position data is greater than approximately 185 degrees and if the measured negative quadrature-axis current aligned raw position data is less than the measured positive quadrature-axis current aligned raw position data, then the following equations apply to determining the position offset:

If $\theta_{pos\_i^*_q} - \theta_{neg\_i^*_q} > 185°$, then $\theta_{axis\_true} = 180°$ or $\theta_{axis\_true} = -180°$ and then $\theta_{pos\_i^*_q}^{adj} = \theta_{pos\_i^*_q} - 360°$, such that $\theta_{neg\_i^*_q} - \theta_{pos\_i^*_q}^{adj} < 175°$, and then $$\theta_{axis\_raw} = \frac{\theta_{pos\_i_q^*}^{adj} + \theta_{neg\_i_q^*}}{2}$$

such that position offset is $$\theta_{offset} = \theta_{axis\_true} - \theta_{axis\_raw} = 180° - \frac{\theta_{pos\_i_q^*}^{adj} + \theta_{neg\_i_q^*}}{2},$$

where $\theta_{neg\_i^*_q}$ is the first aligned raw position data associated with the negative quadrature-axis current command, is $\theta_{pos\_i^*_q}$ is the second aligned raw position data associated with the positive quadrature-axis current command, $\theta_{axis\_true}$ is the true averaging axis, $\theta_{pos\_i^*_q}^{adj}$ is the adjusted second aligned raw position data associated with the positive quadrature-axis current command, $\theta_{axis\_raw}$ is the raw averaging axis position data, and the position offset is $\theta_{offset}$.

8. A method for field calibrating rotor position offset by controlling an electrical motor comprising a rotor with associated magnets and a stator, the method comprising:
while a fixed fake rotor position is provided in a data processing system, applying a positive quadrature-axis current command of a magnitude at a first time and a negative quadrature-axis current command of the substantially same magnitude to the motor at a second time to move the rotor toward an enforced position of the rotor, the second time distinct from the first time;
while the fake rotor position is applied in the data processing system, applying a zero direct-axis current command to the motor while applying the quadrature-axis current commands associated with the enforced position;
measuring a positive quadrature-axis current aligned raw position data for the rotor of the motor after application of the positive quadrature-axis current command and measuring negative quadrature-axis current aligned raw position data for the rotor after application of the negative quadrature-axis current command;
determining a difference between the measured positive quadrature-axis current aligned raw position data and the measured negative quadrature-axis current aligned raw position data to determine whether a true averaging axis is aligned at approximately zero degrees or approximately 180 degrees for the rotor with respect to the stator, where the fake rotor position is approximately zero degrees;
determining raw averaging axis position data based on an average of the measured positive quadrature-axis current aligned raw position data and the measured negative quadrature-axis current aligned raw position data, or where the averaging axis is based on an adjusted raw position data of at least one of the measured positive quadrature-axis current aligned raw position data and the measured negative quadrature-axis current aligned raw position data; and
determining a position offset based on a difference between the determined true averaging axis and the determined raw averaging axis position data.

9. The method according to claim 8 further comprising:
determining whether the three motor leads phase sequence is matching with the raw position data based on applying a monotonic varying position profile associated with a direct voltage command in direct and quadrature axes to the motor;
observing the direction of the rotation associated with rotor and verifying the forward direction of rotation of the rotor during the application of the monotonic increasing position profile associated with the direct voltage command in direct and quadrature axes to the motor.

10. The method according to claim 8 wherein the measured raw position data results from the application of one or more quadrature-axis current commands with opposite magnitudes.

11. The method according to claim 8 wherein if the determining a difference between the measured positive quadrature-axis current aligned raw position data and the measured negative quadrature-axis current aligned raw position data is greater than approximately 185 degrees, or around 185 degrees, and if the measured negative quadrature-axis current aligned raw position data is greater than the measured positive quadrature-axis current aligned raw position data, then the following equations apply to determining the true position offset:

If $\theta_{neg\_i^*_q} - \theta_{pos\_i^*_q} > 185°$, then $\theta_{axis\_true} = 0°$ and $\theta_{neg\_i^*_q}^{adj} = \theta_{neg\_i^*_q} - 360°$, such that $\theta_{pos\_i^*_q} - \theta_{ned\_i^*_q}^{adj} < 175°$, and then $$\theta_{axis\_raw} = \frac{\theta_{pos\_i_q^*} + \theta_{neg\_i_q^*}^{adj}}{2}$$

such that the position offset is $$\theta_{offset} = \theta_{axis\_true} - \theta_{axis\_raw} = -\frac{\theta_{pos\_i_q^*} + \theta_{neg\_i_q^*}^{adj}}{2},$$

where $\theta_{neg\_i^*_q}$ is the first aligned raw position data associated with the negative quadrature-axis current command, $\theta_{pos\_i^*_q}$ is the second aligned raw position data associated with the positive quadrature-axis current command, $\theta_{axis\_true}$ is the true averaging axis, $\theta_{neg\_i^*_q}^{adj}$ is the adjusted first aligned raw position data associated with the negative quadrature-axis current command, $\theta_{axis\_raw}$ is the raw averaging axis position data, and the position offset is $\theta_{offset}$, and where the above 175 degrees is around 175 degrees.

12. The method according to claim 8 wherein if the determining a difference between the measured positive quadrature-axis current aligned raw position data and the measured negative quadrature-axis current aligned raw position data is less than approximately 175 degrees and if the measured negative quadrature-axis current aligned raw position data is less than the measured positive quadrature-axis current aligned raw position data, then the following equations apply to determining the true position offset:

If $\theta_{pos\_i^*_q} - \theta_{neg\_i^*_q} < 175°$, then $\theta_{axis\_true} = 0°$ and then $$\theta_{axis\_raw} = \frac{\theta_{pos\_i_q^*} + \theta_{neg\_i_q^*}}{2},$$

then such that the position offset is $$\theta_{offset} = \theta_{axis\_true} - \theta_{axis\_raw} = -\frac{\theta_{pos\_i_q^*} + \theta_{neg\_i_q^*}}{2}$$

where $\theta_{neg\_i^*_q}$ is the first aligned raw position data associated with the negative quadrature-axis current command, $\theta_{pos\_i^*q}$ is the second aligned raw position data associated with the positive quadrature-axis current command, $\theta_{axis\_true}$ is the true averaging axis, $\theta_{axis\_raw}$ is the raw averaging axis position data, and the position offset is $\theta_{offset}$.

13. The method according to claim 8 wherein if the determining a difference between the measured positive quadrature-axis current aligned raw position data and the measured negative quadrature-axis current aligned raw position data is less than approximately 175 degrees, or around 175 degrees, and if the measured negative quadrature-axis current aligned raw position data is greater than the measured positive quadrature-axis current aligned raw position data, then the following equations apply to determining the position offset:

If $\theta_{neg\_i^*_q} - \theta_{pos\_i^*_q} < 175°$, then $\theta_{axis\_true} = 180°$ or $\theta_{axis\_true} = -180°$ and then $$\theta_{axis\_raw} = \frac{\theta_{pos\_i_q^*} + \theta_{neg\_i_q^*}}{2}$$

such that position offset is $$\theta_{offset} = \theta_{axis\_true} - \theta_{axis\_raw} = 180° - \frac{\theta_{pos\_i_q^*} + \theta_{neg\_i_q^*}}{2},$$

where $\theta_{neg\_i^*_q}$ is the first aligned raw position data associated with the negative quadrature-axis current command, $\theta_{pos\_i^*q}$ is the second aligned raw position data associated with the positive quadrature-axis current command, $\theta_{axis\_true}$ is the true averaging axis, $\theta_{axis\_raw}$ is the raw averaging axis position data, and the position offset is $\theta_{offset}$.

14. The method according to claim 8 wherein if the determining a difference between the measured positive quadrature-axis current aligned raw position data and the measured negative quadrature-axis current aligned raw position data is greater than approximately 185 degrees, or around 185 degrees, and if the measured negative quadrature-axis current aligned raw position data is less than the measured positive quadrature-axis current aligned raw position data, then the following equations apply to determining the position offset:

If $\theta_{pos\_i^*_q} - \theta_{neg\_i^*_q} > 185°$, then $\theta_{axis\_true} = 180°$ or $\theta_{axis\_true} = -180°$ and then $\theta_{pos\_i^*_q}{}^{adj} = \theta_{pos\_i^*_q} - 360°$, such that $\theta_{neg\_i^*_q} - \theta_{pos\_i^*_q}{}^{adj} < 175°$, and then $$\theta_{axis\_raw} = \frac{\theta^{adj}_{pos\_i_q^*} + \theta_{neg\_i_q^*}}{2}$$

such that position offset is $$\theta_{offset} = \theta_{axis\_true} - \theta_{axis\_raw} = 180° - \frac{\theta^{adj}_{pos\_i_q^*} + \theta_{neg\_i_q^*}}{2},$$

where $\theta_{neg\_i^*_q}$ is the first aligned raw position data associated with the negative quadrature-axis current command, $\theta_{pos\_i^*q}$ is the second aligned raw position data associated with the positive quadrature-axis current command, $\theta_{axis\_true}$ is the true averaging axis, $\theta_{pos\_i^*_q}{}^{adj}$ is the adjusted second aligned raw position data associated with the positive quadrature-axis current command, $\theta_{axis\_raw}$ is the raw averaging axis position data, and the position offset is $\theta_{offset}$, and where the above 175 degrees is around 175 degrees.

15. The method according to claim 8 wherein the motor comprises an interior permanent magnet motor or another machine where the magnetic torque component and the reluctance torque component of the machine lie along different axes.

16. A system for calibrating or field calibrating rotor position offset, the system comprising:
an inverter for continuously applying a zero direct-axis current command and for sequentially applying positive and negative quadrature-axis current commands at approximately same magnitude to urge the rotor toward an enforced position, while providing a fixed fake rotor position to a phase converter of the inverter for transformation of three phase representations into two phase representations;
a sensing circuit for measuring a positive quadrature-axis current aligned raw position data after application of the positive quadrature-axis current command and measuring negative quadrature-axis current aligned raw position data for the rotor after application of the negative quadrature-axis command;
a calibrator for determining a difference between the raw position data to determine an alignment of a true averaging axis, the calibrator adapted to determine a raw averaging axis position data based on an average of the raw position data; and the calibrator adapted to determine a position offset based on a difference between the determined true averaging axis and the determined raw averaging axis position data.

17. The system according to claim 16 wherein the calibrator is adapted to determine whether the true averaging axis is aligned at approximately zero degrees or approximately 180 degrees for the rotor with respect to the stator based on the determined difference between the raw position data.

18. The system according to claim 16 further comprising:
a motor with motor leads attached to motor terminals;
an inverter for applying a monotonic varying position profile associated with a direct voltage command in direct and quadrature axes to the motor to determine whether the three motor leads phase sequence is matching with the raw position data; an
a sensing circuit for observing the direction of the rotation associated with rotor and verifying the forward direction of rotation of the rotor during the application of the monotonic increasing position profile associated with the direct voltage command in direct and quadrature axes to the motor.

\* \* \* \* \*